United States Patent [19]

Fujio

[11] 3,819,874

[45] June 25, 1974

[54] DATA RECORDING AND REPRODUCING SYSTEM

[75] Inventor: Yoshio Fujio, Kyoto, Japan

[73] Assignee: Mitsubishi Denki Kabushiki Kaisha, Tokyo, Japan

[22] Filed: Aug. 3, 1973

[21] Appl. No.: 385,472

Related U.S. Application Data

[63] Continuation of Ser. No. 191,243, Oct. 21, 1971, abandoned.

[30] Foreign Application Priority Data

Oct. 30, 1970 Japan .............................. 45-95750
Nov. 26, 1970 Japan .............................. 45-104259

[52] U.S. Cl. ........................ 179/100.3 A, 178/6.7 A

[51] Int. Cl. .......................... G11b 7/02, H04n 5/84

[58] Field of Search 179/100.3 A, 100.3 T, 100.3 B; 178/6.7 A, 7.85, 6.7 R

[56] References Cited

UNITED STATES PATENTS

| | | | |
|---|---|---|---|
| 2,538,869 | 1/1951 | Holst | 179/100.3 T |
| 2,575,445 | 11/1951 | Germer | 179/100.3 A |
| 3,233,039 | 2/1966 | Mullin | 178/6.7 A |
| 3,335,219 | 8/1967 | Goldmark et al. | 179/100.3 A |
| 3,655,908 | 4/1972 | Goldberg et al. | 178/6.7 A |
| 3,769,468 | 10/1973 | Shutterly | 179/100.3 A |

*Primary Examiner*—Alfred H. Eddleman
*Attorney, Agent, or Firm*—Wenderoth, Lind & Ponack

[57] ABSTRACT

Gating pulses are incrementally delayed with respect to the associated horizontal blanking pulses for an electronic flying-spot scanner in response to successive vertical blanking pulses for the scanner to sample an audio signal to cause the samples to intensity modulate a flying spot on the scanner. The modulated flying spot progressively sweeps a record medium in the horizontal direction to record the samples of the signal into a matrix on the medium. The recorded samples are interlaced in the flying-spot scanning direction in which the rows of the matrix are arranged. Alternatively, with no gating pulse used, the modulated flying spot may progressively sweep a record medium in the vertical direction to record the audio signal on a plurality of spaced parallel tracks on the medium. Upon reproducing the scanner sweep the samples or tracks in the horizontal direction to reproduce the signal on the basis of the real time as if they would scan in the vertical direction at a low rate.

5 Claims, 10 Drawing Figures

YOSHIO FUJIO

INVENTOR

BY Wenderoth Lind & Ponack

ATTORNEYS

YOSHIO FUJIO
INVENTOR

BY Wenderoth, Lind & Ponack
ATTORNEYS

YOSHIO FUJIO
*INVENTOR*

BY Wenderoth, Lind & Ponack
*ATTORNEYS*

YOSHIO FUJIO
INVENTOR

BY Wenderoth, Lind & Ponack
ATTORNEYS

YOSHIO FUJIO,
*INVENTOR*

BY Wenderoth, Lind & Ponack
*ATTORNEYS*

DATA RECORDING AND REPRODUCING SYSTEM

This is a continuation, of application Ser. No. 191,243 filed Oct. 21, 1971, now abandoned.

BACKGROUND OF THE INVENTION

This invention relates in general to a system for recording and reproducing data and more particularly to a system for recording a voice type of information by a progressive flying-spot scanning process, and a system for simultaneously reproducing a voice and a picture type of information recorded on a common record medium by using a single flying-spot on an electronic flying-spot scanner.

Upon reproducing the so-called still picture, for example, upon converting a picture on a photographic slide or in a particular frame of a continuous record film to the corresponding electrical signal by the flying-spot scanning process, it has been previously possible to reproduce the information of the type other than that concerning the picture being reproduced, for example, the associated voice or audio information only through the use of additional reproducing means such as a tape recorder provided for that purpose. With this measure utilized to successively reproduce a series of photographic slides, or a series of picture frames of a continuous record film in the order in which the slides or picture frames are disposed or recorded on the film respectively, the simultaneous reproduction of the still picture and the associated audio information can be relatively simply accomplished by using a separate audio reproducer operative in synchronization with a picture projector involved. Under these circumstances, if it is attempted to reproduce the information represented by any desired picture frame of the record film at any given time then the associated audio information is difficult to be reproduced in synchronization with the reproduction of the information represented by that picture frame. This has led to the necessity of providing considerably complicated means for synchronizing the reproduction of the particular picture with the associated audio reproduction. In each case, a separate record medium and another reproducing means therefor have been required to be used leading to a disadvantage that the resulting apparatus becomes large in overall dimension and expensive.

SUMMARY OF THE INVENTION

Accordingly it is an object of the invention to provide a new and improved system for recording and reproducing, on and from a record medium having a picture type of information recorded thereon, the associated voice or audio type of information by a progressive flying-spot scanning process.

It is another object of the invention to provide a new and improved system for simultaneously reproducing a picture and a voice type of information recorded in juxtaposed relationship on a record medium by sweeping the picture and voice types of information with a single flying-spot formed on a flying-spot cathode ray tube.

The invention accomplishes these objects by the provision of a system for recording and reproducing an audio type of information by a progressive flying-spot scanning process, comprising an optical record medium having a picture type of information stored thereon, and electronic flying-spot scanner means characterized in that an audio type of information is progressively recorded on a plurality of arrays disposed in spaced, parallel relationship in one direction in a region adjacent to that region of the optical record medium in which the picture type of information is stored. The audio type of information is arranged on the basis of the real time in the one direction, and the electronic flying-spot scanner means progressively sweeps the optical record medium in a direction substantially perpendicular to the one direction to reproduce the audio type of information on the basis of the real time therefrom and to simultaneously reproduce the picture type of information from the optical record medium.

In a preferred embodiment of the invention, a data recording system may comprise an optical record medium having a picture type of information stored thereon, electronic flying-spot scanner means operative with horizontal and vertical blanking pulses to progressively sweep the optical record medium in one direction, gate means having an audio type of information applied thereto and connected to a control grid electrode of the electronic flying-spot scanner means. In addition gating pulse generator means may be connected to the gate means to generate gating pulses in synchronization with the horizontal blanking pulses, and means responsive to the vertical blanking pulses may be provided to control the gating pulse generator means to incrementally delay the gating pulses with respect to the associated horizontal blanking pulses. The gating means may be gated with the gating pulses from the gating pulse generator means to sample the audio type of information to apply the sampled data to the control grid electrode of the electronic flying-spot scanner means whereby the sampled data are successively recorded in a direction substantially perpendicular to the flying-spot scanning direction to form a sample matrix.

In order to sequentially record an audio type of information on a plurality of audio tracks disposed in spaced, parallel relationship on an optical record medium and on the basis of the real time, the recording system may comprise an electronic flying-spot scanner means including a control grid electrode to progressively sweep the optical record medium in the vertical direction, means for applying an audio type of information to the control grid electrode of the flying-spot scanner means, and means including a step waveform generator responsive to each of vertical blanking pulses operative on the flying-spot scanner means to generate a step waveform which drops back to zero after a predetermined number of the vertical blanking pulses is applied to the step waveform generator. The step waveform being operative to deflect a beam of electrons in the electronic flying-spot scanner means stepwise in the horizontal direction thereby to cause the flying-spot scanner means to progressively record the audio type of information on a plurality of audio tracks disposed in spaced, parallel relationship on the optical record medium and in the vertical direction on the basis of the real time.

In another preferred embodiment of the invention, a data reproducing system may comprise an optical record medium having a picture type of information and an audio type of information stored in juxtaposed relationship thereon, the audio type of information being in the form of a matrix including data interlaced in one of two orthogonal directions and disposed on the basis of the real time in the other direction. An electronic flying-spot scanner means operative with horizontal and vertical blanking pulses progressively sweeps the picture and audio types of information in the one direction. In addition one optical-to-electrical conversion element is operatively coupled to each of the picture and audio types of information to convert the data thereof swept by the electronic flying-spot scanner means to the corresponding electrical pulses. Gate means are connected to the optical-to-electrical conversion elements for the audio type of information, and gating pulse generator means are connected to the gate means to generate gating pulses in synchronization with the horizontal blanking pulses. The system also includes means responsive to the vertical blanking pulses to control the gating pulse generator means to incrementally delay the gating pulses with respect to the associated horizontal blanking pulses. The gate means thus being gated with the gating pulses from the gating pulse generator means to sample the electrical pulses from the associated optical-to-electrical conversion element to reproduce the audio type of information on the basis of the real time with the conversion element for the picture type of information simultaneously reproducing the picture type of the information.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

According to the principles of the invention, the progressive flying-spot scanning process is utilized to record an audio type of information with a varying density on an optical record medium in its audio region or frame adjacent to that region or frame having stored thereon a still picture associated with the audio type of information as well as reproducing simultaneously an audio type of information and a picture type information such as the associated still picture recorded side by side on an optical record medium. Any audio type of information can be recorded in a format as shown in FIG. 1.

Figures 1, 2, 3:
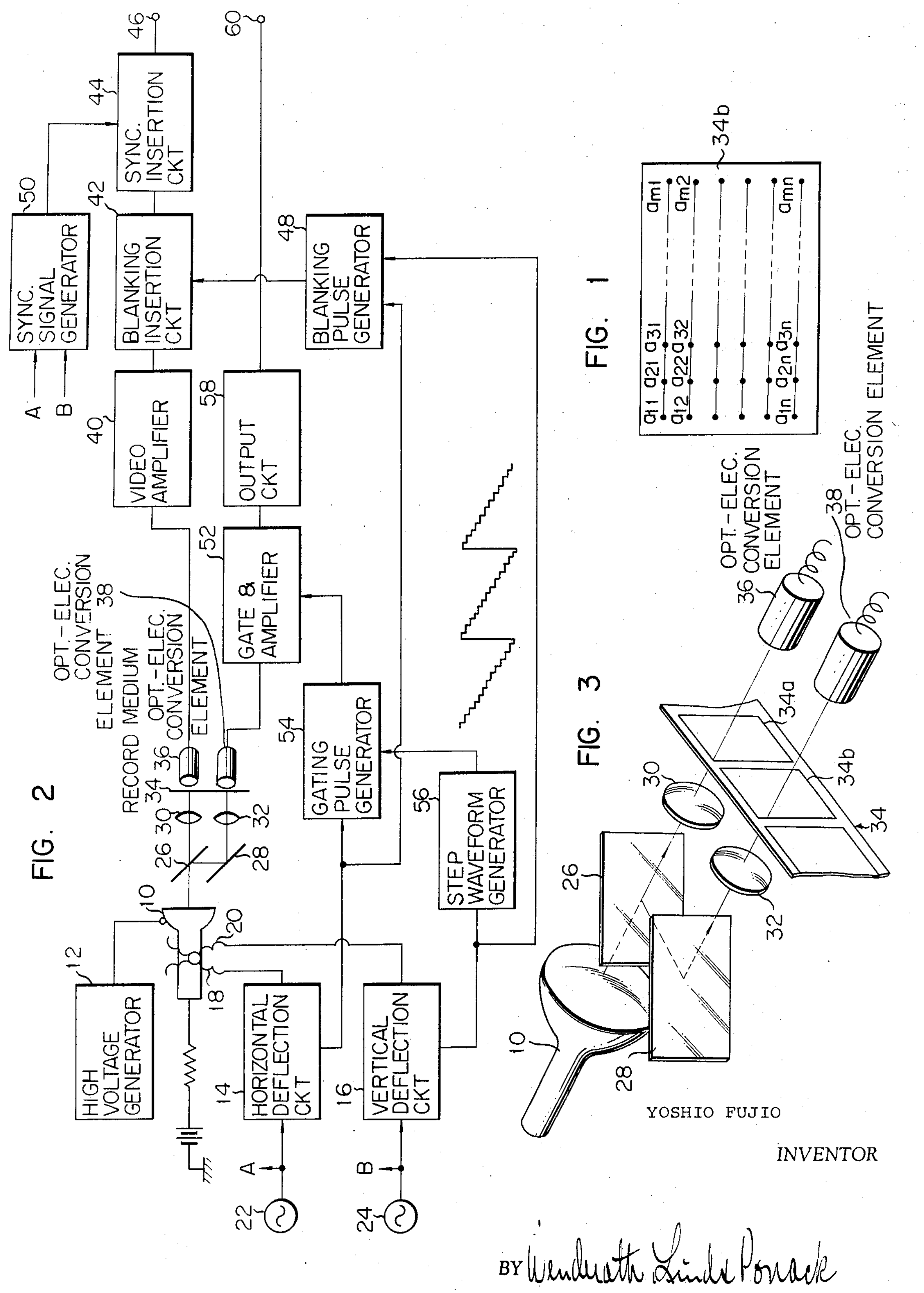
FIG. 1 is a plan view of a record format into which an audio type of information is recorded on an optical record medium in accordance with the principles of the invention.
FIG. 2 is a block diagram of a system for simultaneously reproducing a picture and an audio type of information in accordance with the principles of the invention.
FIG. 3 is a perspective view of optical components of the reproducing system illustrating in FIG. 2.

As shown in FIG. 1, an audio type of information consists of data arranged into a matrix having $m$ columns and $n$ rows. More specifically, the data $a_{ij}$ where $i = 1, 2, \ldots m$ and $j = 1, 2, \ldots n$ have a time sequence $a_{11}, a_{12}, \ldots a_{in}, a_{21}, a_{22}, \ldots a_{2n}, a_{31}, a_{32}, a_{3m}, \ldots a_{ml}, a_{m2}, \ldots, a_{mn}$ and are adapted to scan in the order of $a_{11}, a_{21} \ldots a_{ml}, a_{12}, a_{22}, \ldots a_{m2}, \ldots a_{1n}, a_{2n}, \ldots a_{mn}$ by an electronic flying-spot scanner as will be described hereinafter. That is, the data are interlaced in the scanning direction or in the rows. The data may be called hereinafter "samples". A matrix such as shown in FIG. 1 is recorded in one region or frame of an optical record medium, for example, a motion-picture film, juxtaposed to that region or frame in which the associated still picture is stored and includes the entirety of an audio type of information concerning the stored picture.

Referring now to FIG. 2 of the drawings, there is illustrated a system for simultaneously reproducing an audio type of information and the associated picture from a record medium in accordance with the principles of the invention. The arrangement illustrated comprises an electronic flying-spot scanner tube 10, a high voltage generator circuit 12 for forming a flying-spot on the screen of the scanner tube 10, a horizontal deflection circuit 14 for supplying a horizontal deflection current to a horizontal yoke 18 disposed on the scanner tube 10 and a vertical deflection circuit 16 for supplying a vertical deflection current to a vertical deflection yoke 20 disposed on the tube 10. The deflection circuits 14 and 16 are controlled by frequency sources 22 and 24 for producing the line or horizontal frequency and the field frequency respectively. All the components 10 through 24 are well known in the art and need not be further described.

However, it is to be noted that both deflection circuits 14 and 16 cooperate with each other to deflect a beam of electrons generated in the scanner tube 10 in the vertical and horizontal directions at scanning rates equal to those used with the particular television standards such as U.S. Television Standards. The beam of electrons thus deflected strikes against the screen of the scanner tube 10 to form on the screen, a spot moves in the same direction as the beam of electrons is deflected.

A beam of light emitted from the moving or flying spot on the screen of the flying-spot scanner tube 10 falls upon a half-silvered mirror 26 which, in turn, transmits one portion of the light beam therethrough and reflects the remaining portion thereof toward a reflecting mirror 28. The beam portion transmitted through the mirror 26 and the beam portion reflected from the mirrors 26 and 28 pass through individual focussing lenses 30 and 32 to be focussed at respective points on an optical record medium 34 such as a photographic slide or a motion-picture film. The illuminated points on the record medium are "viewed" by separate optical-to-electrical conversion elements 36 and 38 on their light receiving surfaces respectively.

As shown in FIG. 3, the optical record medium 34 includes a region or frame 34*a* having stored therein a still picture (not shown) and another region or frame 34*b* juxtaposed to the region or frame 34*a* and having recorded therein an audio type of information (not shown). It is assumed that the audio type of information has been recorded on the record medium 34 in the format as shown in FIG. 1. The frames 34*a* and *b* may be called hereinafter the picture and audio frames respectively. The record medium 34 includes a plurality of audio frames alternating with a plurality of picture frames.

FIG. 3 also illustrates the optical elements as above described in conjunction with FIG. 2 and depicts that the beam portion transmitted through the mirror 26 falls upon a point in the picture frame 34*a* while the beam portion reflected from the mirrors 26 and 28 is incident upon a point in the audio frame 34*b*.

Each of the conversion elements 36 and 38 converts the optical energy to the corresponding electrical signal having an amplitude proportional to the photographic or recorded density of that point in the associated frame where the beam portion of light has been focussed. Thus the picture and audio frames 34*a* and *b* respectively scan with the single flying spot on the scanner tube 10 progressively moved in one direction, in this case, the horizontal direction or from the left to the right as viewed in FIG. 1 and across the frames from the top toward the bottom thereof. This results in the formation of an electrical signal at the output of the individual conversion element 36 or 38 having an amplitude proportional to the density of the information recorded in each frame.

Referring back to FIG. 2, the electrical signal from the conversion element 36 is amplified by a video amplifier 40 and then passes through a blanking insertion circuit 42 and a synchronizing signal insertion circuit 44 to form, at a video output terminal 46, a video signal compatible with that produced, for example, in accordance with U.S. Television Standards. The blanking insertion circuit 42 is controlled by a blanking pulse generator 48 operative in response to horizontal and vertical blanking pulses supplied by the horizontal and vertical deflection circuits 14 and 16 respectively to supply horizontal and vertical blanking pulses to the blanking insertion circuit 42. The synchronizing signal generator 50 is supplied by the frequency sources 22 and 24 as shown by the reference characters "A" and "B" in FIG. 2 to apply the required synchronizing signals to the synchronizing insertion circuit 44.

On the other hand, the electrical signal from the audio conversion element 38 is what is obtained by the flying-spot on the scanner tube 10 horizontally sweeping the particular audio frame such as the audio frame 34*b* (see FIG. 3) at scanning rates equal to those used, for example, with U.S. Television Standards. In other words, the electrical signal includes the entirety of the audio information reproduced in interlaced format within one television field period. This means that the entirety of the audio information are developed in its condensed state within one field period. The conversion element 38 provides repeatedly such an electrical signal once for each field period.

Then the signal is applied to a combined gate and amplifier circuit 52 gated by a gating pulse generator 54 which is, in turn, controlled by a step waveform generator 56.

Figure 4:
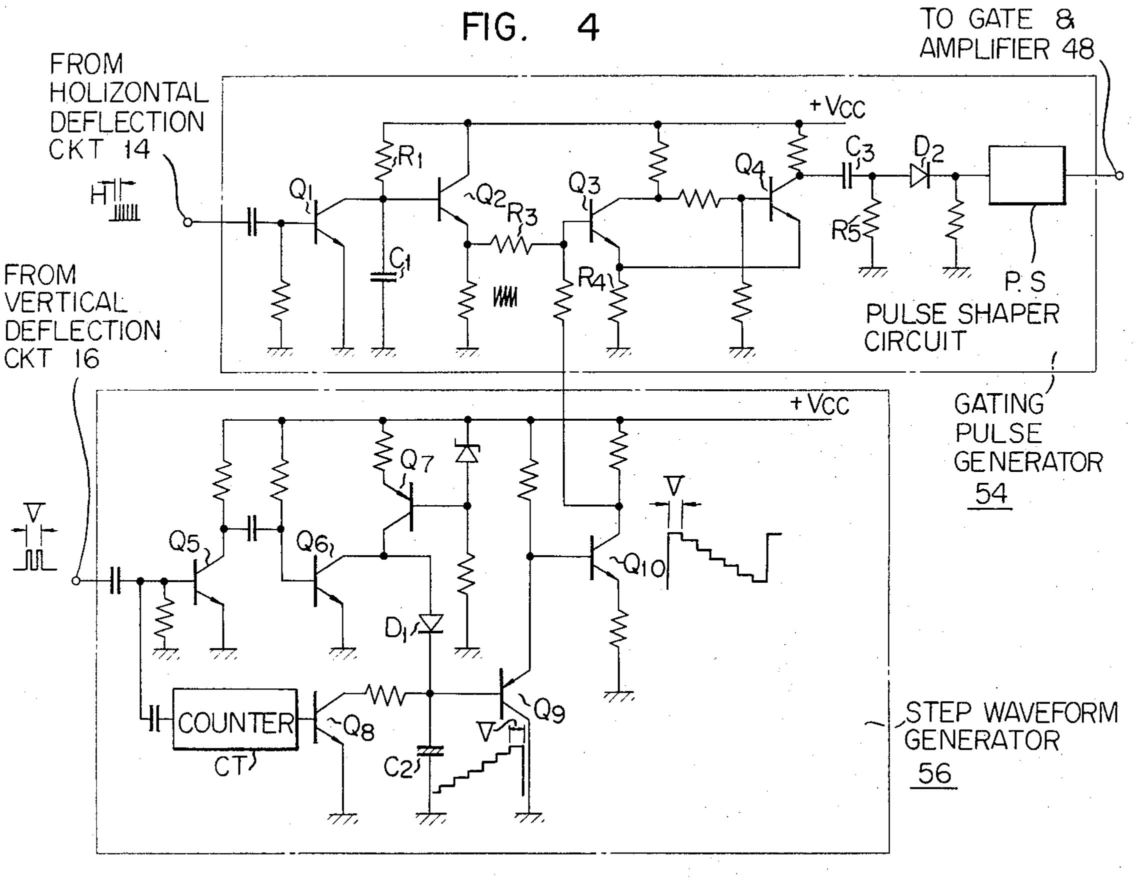
FIG. 4 is a schematic circuit diagram of the gating pulse and step waveform generators for sampling purpose illustrated in FIG. 3 with certain waveforms illustrated beside the associated points in the circuit.

The gating pulse generator 54 and the step waveform generator 56 are preferably of circuit configurations as shown in FIG. 4. The step waveform generator 56 has applied to its input terminal a train of vertical blanking pulses from the vertical deflection circuit 16 as shown beside the input terminal and also shown at waveform (*a*) in FIG. 5. The pulses are successively supplied to a grounded emitter transistor $Q_5$ where they are inverted in phase as shown on the output side thereof. The inverted pulses are applied to a grounded emitter transistor $Q_6$. The transistor $Q_6$ is normally conducting and put in its nonconducting state only for the duration of the negative pulses applied thereto or of the vertical blanking pulses. Assuming that a first pulse of the negative pulse train is applied to the transistor $Q_6$ to put it in its nonconducting state, a charging transistor $Q_7$ permits a source of direct current $+V_{cc}$ to supply a charging current to a capacitor $C_2$ through the same and a semiconductor diode $D_1$ to increase a potential on that side thereof connected to the diode $D_1$ by a predetermined fixed magnitude.

Upon the termination of the first vertical blanking pulse, the transistor $Q_6$ is returned back to its conducting state in which the collector potential decreases to a zero to reversely bias the diode $D_1$. That is, the diode becomes nonconducting. On the other hand, a grounded emitter transistor $Q_8$ connected to the capacitor $C_2$ is normally nonconducting while a grounded collector transistor $Q_9$ also connected to the capacitor $C_2$ has an internal resistance enough to provide a sufficiently large time discharge constant with the capacitance of the capacitor $C_2$. Under these circumstances, the charge on the capacitor $C_2$ is maintained substantially at a predetermined fixed magnitude until the subsequent pulse is applied to the transistor $Q_5$.

When a second pulse of the pulse train is applied to the generator 56, the transistor $Q_6$ again becomes nonconducting to cause the capacitor $C_2$ to charge in the manner as above described. Thus the potential of the capacitor $C_2$ relative to ground is further increased by a fixed magnitude substantially equal to the abovementioned magnitude. Each time the vertical blanking pulse reaches the generator 56, the process as above described is repeated to provide the voltage across the capacitor $C_2$ incrementally increased in synchronization with the vertical blanking pulses. In other words, the capacitor $C_2$ produces a step waveform as shown beside it.

On the other hand, the train of vertical blanking pulses is also applied to a counter CT. The counter CT counts the pulses so that one positive pulse is produced each time it has counted a predetermined number (*m*) of the pulses equal to the number of the columns included in a recorded matrix such as shown in FIG. 1. This pulse causes the transistor $Q_8$ to be conducting to permit the capacitor $C_2$ to discharge through the now conducting transistor $Q_8$ until the potential on the capacitor $C_2$ becomes null. For the predetermined number (*m*) of the vertical blanking pulses the process as above described is repeated to form recurrently the step waveform. Then the step waveform is applied by the transistor $Q_9$ to a common emitter transistor $Q_{10}$ where it is inverted in phase as shown beside the latter and also shown at waveform (*b*) in FIG. 5. The inverted step waveform is applied to the gating pulse generator 54.

Figure 5:
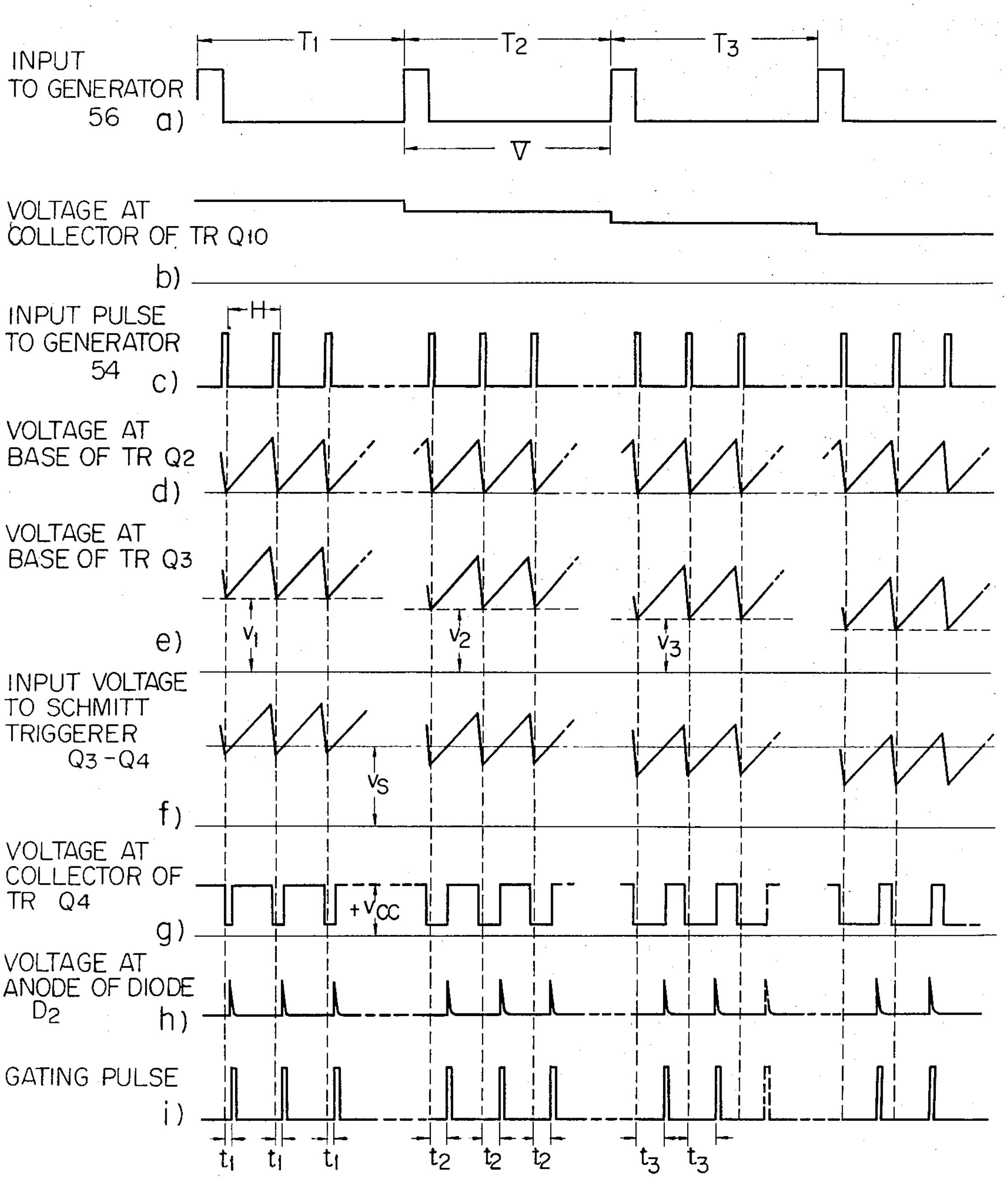
FIG. 5 is a graph illustrating waveforms developed at various points in the gating pulse generator shown in FIG. 4 and useful in explaining the principles of the invention.

The gating pulse generator 54 has applied to its input terminal a train of horizontal blanking pulses from the horizontal deflection circuit 14 as shown beside the terminal. The horizontal blanking pulses are best shown at waveform (*c*) in FIG. 5. Each of those pulses is inverted in phase by a grounded emitter transistor $Q_1$ and then integrated by a series combination of resistor $R_1$ and capacitor $C_1$ connected across a source of direct current $+V_{cc}$ and ground with the junction of the resistor $R_1$ and capacitor $C_1$ connected to the collector and base electrodes respectively of the transistors $Q_1$ and $Q_2$. This integration results in a sawtooth waveform as shown beside the junction and best shown at waveform (*d*) in FIG. 5. The sawtooth waveform is supplied to a common emitter transistor $Q_2$ directly coupled to the transistor $Q_1$ for amplification. The amplified sawtooth waveform is applied through a resistor $R_3$ to a base electrode of a common emitter transistor $Q_3$ having also the step waveform supplied from the transistor $Q_{10}$ in the step waveform generator 56 through a resistor $R_4$. Therefore, the transistor $Q_3$ is operated to combine the sawtooth waveform with the step waveform to provide at the base electrode a voltage as shown at waveform (*e*) shown in FIG. 5. That is, a voltage at the base electrode of the transistor $Q_3$ is a sawtoothed voltage superposed on a voltage maintained constant between each pair of successive vertical blanking pulses or for each field period but decreased for the succeeding field period. For example, the sawtoothed voltage is superposed on a constant voltage of $v_1$ for a first field period $T_1$ (see FIG. 5) and on another constant voltage of $v_2$ less than the preceding voltage $v_1$ for the succeeding field period $T_2$. For a third field period $T_3$, the sawtoothed voltage is superposed on a further constant voltage $v_3$ less than the voltage $v_2$ and so on (see waveform (*e*); FIG. 5).

The transistor $Q_3$ forms a Schmitt trigger circuit with a common emitter transistor $Q_4$. Assuming that this Schmitt trigger circuit has a threshold voltage $v_s$ as shown in FIG. 5 (*f*), the transistor $Q_4$ produces at the collector elector rectangular pulses as shown at waveform (*g*) in FIG. 5. As above described, the saw toothed voltage at the base electrode of the transistor $Q_3$ progressively decreased in peak magnitude as the field periods are repeated or with an increase in the number of the vertical blanking pulses applied to the generator 56 so that the leading edges of the rectangular pulses at the collector electrode of the transistor $Q_4$ is incrementally delayed with respect to the associated horizontal blanking pulses as the vertical blanking pulses are recurrently applied to the step waveform generator 56 (see waveform (*g*) shown in FIG. 5). The rectangular pulses are applied to a differentiation circuit consisting of a capacitor $C_3$ and a resistor $R_5$ and thence to a semiconductor diode $D_2$. Due to its polarity, the diode $D_2$ permits positive pulses to be developed at the anode electrode as shown at waveform (*h*) in FIG. 5. The positive pulses results from the differentiation of the leading edge of the rectangular pulses (*g*). Then the positive pulses are formed by any suitable pulse shaper circuit PS to form a train of gating pulses as shown at waveform (*i*) in FIG. 5. This train of gating pulses is applied to the combined gate and amplifier circuit 52 as shown in FIG. 2.

By comparing the waveform (*c*) with the waveform (*i*) shown in FIG. 5, it will be seen that, as the voltage progressively decreases with the successive field periods is superposed on the sawtoothed voltage at the base electrode of the transistor $Q_3$ that a time interval between the application of each horizontal blanking pulse to the generator 54 and the occurrence of the corresponding pulse progressively increases as shown by time intervals $t_1, t_2, t_3 \ldots$ in FIG. 5(*i*). It is to be noted, however, that the time interval just described remains substantially unchanged between each pair of succeeding vertical blanking pulses applied to the step waveform generator 56 or for each field period.

As best shown in FIG. 5, the step waveform (*b*) is highest in magnitude for a first field period $T_1$ when the particular audio type of information and the associated picture type of information are first scanning, and progressively decreases in magnitude as a second field period $T_2$ et seqq are successively repeated. Therefore, with respect to time, each gating pulse is developed just next to the associated horizontal blanking pulse for the first field period $T_1$, displaced somewhat to the right for the second field period $T_2$ and further to the right as viewed in FIG. 5(*i*) for the third field period $T_3$ and so on. In other words, the gating pulses are incrementally time-delayed with respect to the associated horizontal blanking pulses as the field period is repeated.

Referring back to FIG. 2, the combined gate and amplifier circuit 52 is gated by the gating pulse generator 54 so that it samples and amplifies samples concerning only at that single point located in the audio frame and in the particular horizontal scanning line then scanning with the flying-spot on the scanner tube 10. Since the gating pulses are time delayed with respect to the associated horizontal blanking pulses by a predetermined time increment for each field period as above described, the combined gate and amplifier circuit 52 samples the corresponding point lying in all the horizontal scanning lines during each field period or during each scanning of the picture and audio frames. For the succeeding field period, the circuit 52 samples that point located next to the previously sampled point in each horizontal scanning line because the gating pulses are time delayed as above described.

More specifically, samples arranged in the format of FIG. 1 to form the particular audio type of information progressively scan from the left to the right and across the frame from the top toward the bottom as viewed in FIG. 1 to complete a first scanning of the audio frame. That is, the flying-spot on the scanner tube 10 first sweeps the samples $a_{11}, a_{21}, \ldots a_{m1}$ in the uppermost row in the named order and then flys back to the sample $a_{12}$ in the second row after which it similarly sweeps the samples $a_{12}, a_{22}, \ldots a_{m2}$. Thereafter the process as above described is repeated with the succeeding rows until the lowermost row $a_{1n}, a_{2n}, \ldots a_{mn}$ is swept with the flying-spot to complete a first scanning of the audio frame or to terminate one field period. Thereafter the process as above described is repeated.

Figure 6:
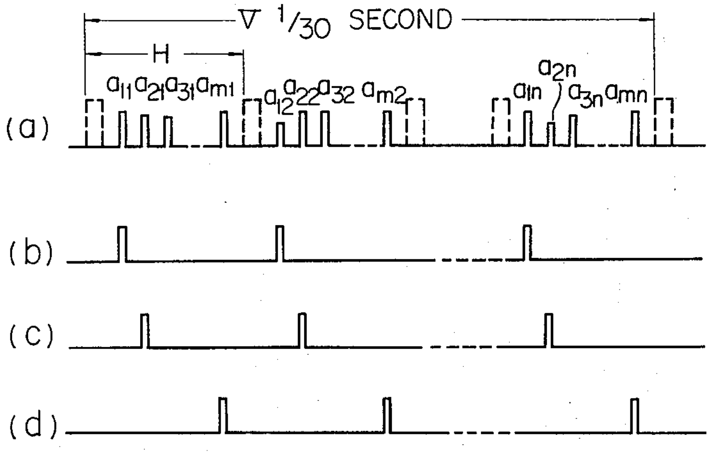
FIG. 6 is a graph illustrating a train of reproduced pulses as sampled and the associated gating pulses.

During each scanning, the optical-to-electrical conversion element 38 for the audio frame provides at the output a train of pulses as shown at waveform (*a*) in FIG. 6. The train of pulses are shown as including pulses $a_{11}a_{21}, a_{31}, \ldots a_{m1}, a_{12}, a_{22}, a_{23}, \ldots a_{ml}, \ldots, a_{1n}, a_{2n} \ldots a_{mn}$ resulting from the corresponding samples designated by the same reference characters as the pulses in FIG. 1. While the train of pulses is shown as including one relatively wide pulse illustrated as a dotted line located at the beginning of each train portion for each row, the wide pulses are not actually included in the train of pulses and are shown only for the purpose of indicating the temporal position of each horizontal blanking pulse relative to the reproduced pulses. As above described, the reproduced pulses are interlaced.

During the first scanning or for the first field period, the gating pulse generator 54 supplies the gating pulses to the combined gate and amplifier circuit 52 substantially simultaneously with the generation of the pulses $a_{11}, a_{12}, \ldots a_{1n}$, as shown at waveform (*b*) in FIG. 6 which will readily be understood from the description made in conjunction with FIGS. 4 and 5. Therefore the circuit 52 is gated with those gating pulses to permit the pulses $a_{11}, a_{12}, \ldots a_{1n}$ to pass therethrough in the named order.

For the second field period, the circuit 52 is gated with the gating pulses as shown at waveform (*c*) in FIG. 6 to sample the pulses $a_{21}, a_{22}, a_{23} \ldots a_{2n}$ and so on. Eventually the gate and amplifier circuit 52 responds to the gating pulses as shown at waveform (*d*) in FIG. 6 to sample the pulses $a_{m1}, a_{m2}, \ldots a_{mn}$ whereupon the information recorded in the audio frame 34*b* has been read out. If desired, the process as above described may be repeated an indefinite number of times to recurrently read out the information. It will be understood that during the repeated scanning of the audio frame, the flying-spot on the scanner tube 10 simultaneously sweeps the associated picture frame in repeated manner.

Thus the gate and amplifier circuit 52 produces at the output a train of pulses arranged temporally in the same order as the samples shown in FIG. 1. In other words, the gate and amplifier circuit 52 provides a signal converted into an equivalent to what will be formed by sweeping the audio frame at a low rate and, in effect, in a direction perpendicular to the direction in which the associated picture frame scans with the result that it is possible to be read out the audio information on the basis of the real time.

The signal thus reproduced is applied to an output circuit 58 including a sample holder, a lowpass filter, an amplifier etc. (not shown) to provide an audio signal at an audio output terminal 60 which signal is a replica of the audio type of information recorded in the audio frame of the record medium on the basis of the real time.

Assuming that $T_r$ designates a field period or a time interval required for the samples $a_{11}a_{12}, \ldots a_{1n}$ to be read out with each row including *m* samples (see FIG. 1), the total time in seconds required to read out the entirety of an audio type of information is expressed by $$t = mT_r \tag{1}$$

If a time interval from the start of one horizontal line to the start of the succeeding horizontal line is H seconds then it is possible to reproduce an audio type of information including components of frequencies up to at most ½H hertzs for the time interval of *t*.

Figure 7:
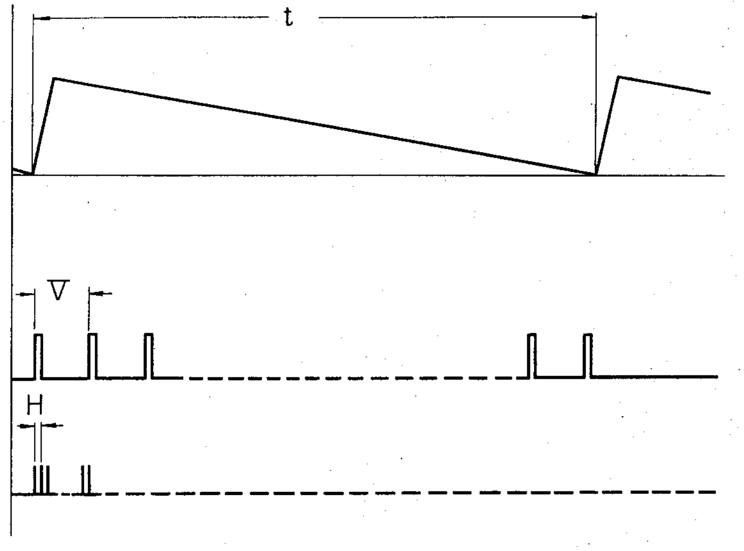
FIG. 7 is a graph illustrating waveforms used with a modification of the sampling means.

While the gating pulse generator 54 has been described as being controlled by the step waveform generator 56, it is to be understood that the gating pulse generator 54 may be controlled by a sawtooth waveform generator for generating a sawtooth waveform having a very long repetition period *t* as shown in FIG. 7, wherein *t* represents time interval required for the entirety of an audio type of information to be read out. That is, the *t* satisfies the above equation (1). In FIG. 7 there are also illustrated the vertical and horizontal blanking pulses on the middle and lower portions, respectively. It will be understood that the use of such a sawtooth waveform causes the gating pulses to be incrementally delayed with respect to the associated horizontal blanking pulse resulting in a more or less tilt of loci for real-time readout corresponding to the columns of the matrix as shown in FIG. 1. However, if the columns of the matrix are initially tilted to the corresponding extent, the use of the sawtooth waveform as shown in FIG. 7 will be identical in results to the use of the step waveform generator 56 as shown in FIG. 4.

Figure 8:
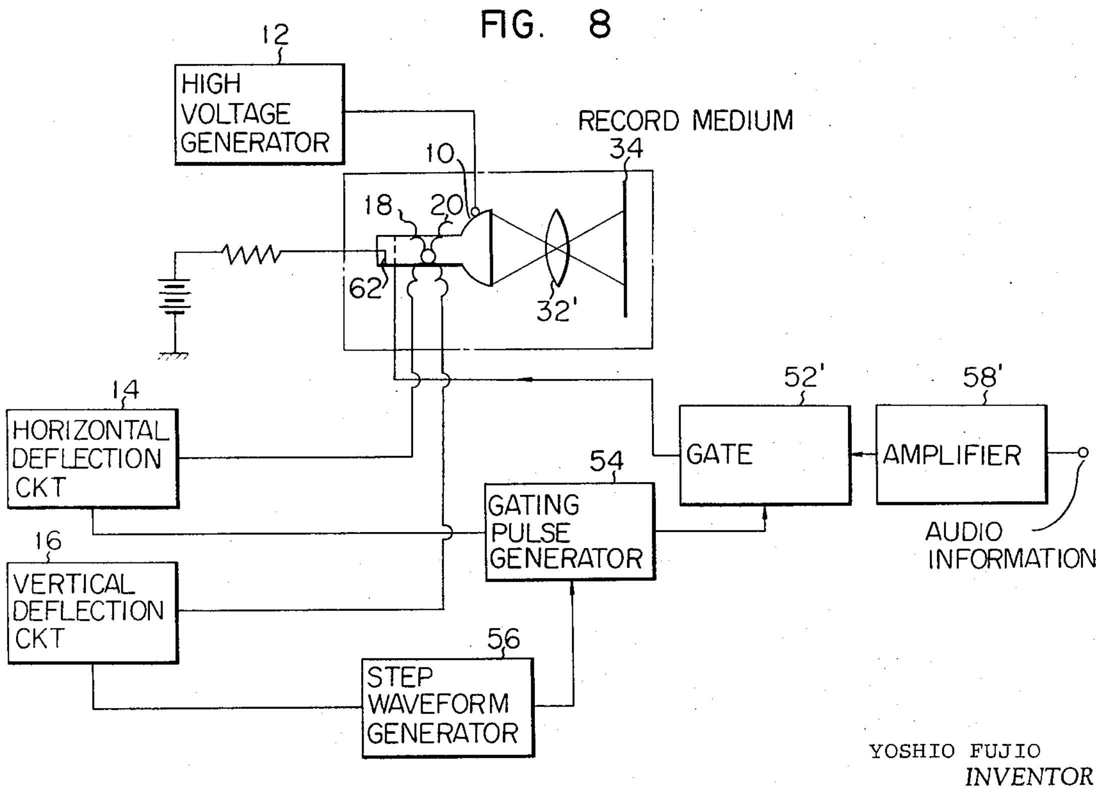
FIG. 8 is a block diagram of one form of a data recording system constructed in accordance with the principles of the invention.

From the foregoing, it will be understood that an audio type of information can readily be recorded in the format as shown in FIG. 1 on an optical record medium by using a gate circuit controlled by the gating pulse and step waveform generators as illustrated in FIGS. 2 and 4. Such a recording system is shown in FIG. 8, wherein like reference numerals designate the components identical or similar to those illustrated in FIG. 2. In the arrangement of FIG. 8, an ammplifier 58′ supplies an amplifier representation of an audio type of information to a gate circuit 52′ connected to the flying-spot scanner tube 10 at the control grid electrode 62. In other respects, the arrangement is substantially identical to that shown in FIG. 2 except for the omission of the audio conversion element and those components associated with a picture frame. Thus the gate circuit 52′ is gated with the gating pulses provided from the gating pulse generator 54 controlled by the step waveform generator 56 and in the same manner as above described in conjunction with FIGS. 4 and 5 with the result that the audio type of information is applied through the gated gate circuit 52′ to the control grid electrode 62 of the flying-spot scanner tube 10. At that time or upon the generation of each gating pulse, the scanner tube 10 forms a flying-spot on the screen. A light beam from the flying-spot is intensity modulated with that portion of the information then applied to the control grid 62 and falls upon an audio frame such as frame 34*b* shown in FIG. 3 of the optical record medium 34 through a focussing lens 32′ to record it on the audio frame. As will readily be understood from the foregoing description made in conjunction with the reproducing system, the information of variable density type is progressively recorded in the audio record frame in a direction perpendicular to the scanning lines resulting in a representation of the audio type of information recorded in the format such as shown in FIG. 1.

It is assumed that the field period is one-thirtieth second and the number of the scanning lines is equal to 262 with an aspect ratio equal to 4 : 3. Under the assumed condition, the format includes each column having 262 samples and each row having the samples whose number is equal to $2 \times 262 \times 4/3 = 700$ provided that the samples are distributed at intervals equal in the vertical direction to those in the horizontal direction. This results in the total number of the samples amounting to $262 \times 700 = 183{,}400$. Accordingly, a maximum possible time interval for which an audio type of information can be recorded is equal to $700 \times 1/60 = 11.7$ seconds, as is apparent from the above equation (1).

With reference to FIG. 8, the invention has been described to record sample data from an audio type of information in the form of a matrix such as shown in FIG. 1 on an optical record medium but it is to be understood that, according to another aspect of the invention, any audio type of information can be sequentially recorded on a plurality of audio tracks disposed in spaced, parallel relationship on an optical record medium and substantially perpendicular to the scanning direction during reproduction without the information sampled.

Figure 9:
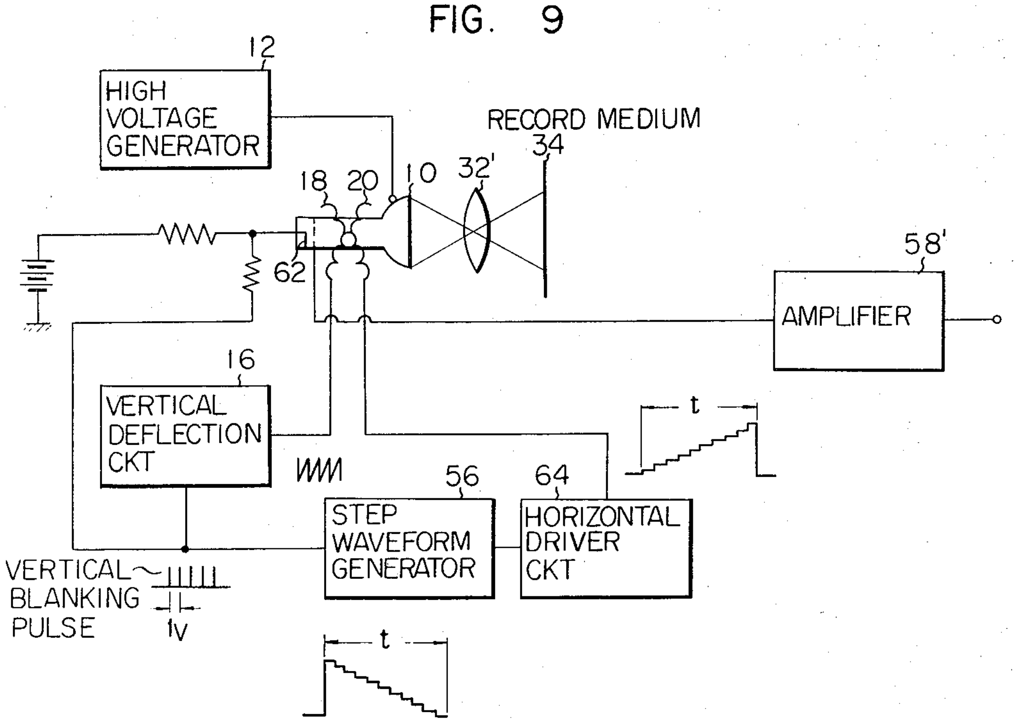
FIG. 9 is a block diagram of another form of a recording system constructed in accordance with the principles of the invention.

A recording system of the type just described is shown in FIG. 9 wherein like reference numerals designate the components identical or similar to those illustrated in FIG. 8. The vertical deflection circuit 16 supplies to the vertical deflection yoke 20 a sawtoothed current having a repetition period equal to one field period for reproduction (see waveform shown on the output side thereof) thereby to deflect a beam of electrons generated in the flying-spot scanner tube 10 in the vertical direction. The vertical diflection circuit 16 also supplies the vertical blanking pulses to the step waveform generator 56 which, in turn, generate a step waveform in the manner as above described in conjunction with FIGS. 4 and 5. The resulting step waveform is similar to waveform (*b*) shown in FIG. 5 and also shown below the block 56. The waveform has a repetition period of *t* and drops to zero after a predetermined number (*m*) of the vertical blanking pulses are applied to the step waveform generator 56. That period is equal to a time interval required to read out the entirety of an audio type of information.

The step waveform is applied to a horizontal driver circuit 64 where it is inverted in phase and amplified. The inverted, amplified step waveform as shown above block 64 is supplied to the horizontal deflection yoke 18 of the flying-spot scanner tube 10 to deflect the beam of electrons stepwise in the horizontal direction.

On the other hand, an audio type of information is applied through the amplifier 58' to the control grid electrode 62 of the flying-spot tube 10 to modulate an intensity of a flying spot on the tube resulting from the deflected beam of electrons. Then the flying spot is focussed on an optical record medium 34 by the focussing lens 32' to form an optical record of variable density type on the medium.

Figure 10:
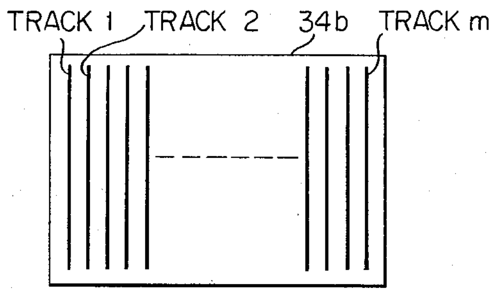
FIG. 10 is a plan view of a record format into which an audio type of information is recorded on an optical record medium by the recording system shown in FIG. 9.

More specifically, for a first vertical scanning period, the flying spot moves across a first vertical track from the top to the bottom and then flys back to the top of a second vertical track parallel and slightly spaced away from the first track to initiate a second vertical scanning period. For the second scanning period the flying spot similarly moves across the second track and so on. Eventually the flying spot moves across the last vertical track to complete the recording of the audio information. The resulting record after having been developed is shown in FIG. 10. In FIG. 10 an audio frame 34'*b* is shown as including a plurality of audio tracks, in this case, m tracks vertically disposed in spaced parallel relationship thereon and designated by "TRACK 1", "TRACK 2" . . . , "TRACK *m*". The audio type of information is progressively recorded on those audio tracks on the basis of the real time starting with the first track called "TRACK 1".

It will readily be understood that the reproducing system of FIG. 2 is used to progressively sweep the audio frame 34*b* as shown in FIG. 10 in the horizontal direction to reproduce the audio type of information therefrom.

While the invention has been illustrated and described in conjunction with a few preferred embodiments thereof it is to be understood that numerous changes and modifications may be resorted to without departing from the spirit and scope of the invention.

What is claimed is:

1. A data reproducing system for simultaneously reproducing an audio and a picture type of information recorded, respectively, in two juxtaposed regions on an optical record medium, comprising a single source of light for emitting a light beam, means for splitting said light beam into first and second beam portions, scanning means for causing said first beam portion to sequentially scan the picture region to directly reproduce the picture type of information and for causing said second beam portion to sequentially scan the audio region in the same direction as said first beam portion, said audio type of information including audio data arranged in the form of a matrix having rows and columns, the audio data being sequentially located in the columns one below the other and in columns following each other on the basis of real time, aid scanning means causing said second beam portion to repeatedly scan the audio region in the direction of the rows and means for selectively selecting the audio data in each column, one below the other and in columns following each other, whereby the audio type of information is reproduced.

2. A data reproducing system according to claim 1 including a flying spot scanner means and wherein said source of light is in the form of a flying spot from said electronic flying spot scanner means, the system further including optical to electrical conversion means for receiving said second beam portion transmitted through said audio region for converting said beam portion to an electrical signal corresponding to the respective audio data to be reproduced, and said means for selecting including means for sequentially sampling this electrical signal to reproduced the audio type of information.

3. A data reproducing system according to claim 2 further including a horizontal deflection circuit and a vertical deflection circuit operatively connected to said flying spot scanner means, a gating circuit connected to said optical to electrical conversion means, a pulse generator circuit for generating gating pulses in synchronization with horizontal retrace pulses from said horizontal deflection circuit and control means responsive to each of the vertical blanking pulses from said vertical deflection circuit to progressively move the temporal position of the gating pulse relative to the associated horizontal blanking pulse, the gating circuit being operative in response to the gating pulses to sequentially sample the electrical signal corresponding to the audio data.

4. A data reproducing system according to claim 3 wherein said control means includes integration means for integrating a predetermined number of said vertical blanking pulses to generate a step waveform, said pulse generator circuit includes means for generating sawtooth waveforms in synchronization with the horizontal blanking pulses, and means for combining said sawtooth waveform with said step waveform to form gating pulses incrementally delayed with respect to the associated horizontal blanking pulses.

5. A data reproducing system according to claim 3 wherein said control means includes means for generating a first sawtooth waveform having a repetition period equal to the time interval required for entirely reading out the audio type of information, said gating pulse generator circuit includes means for generating a second sawtooth waveform in synchronization with the horizontal blanking pulses, and means for combining the second waveform with the first sawtooth waveform to form the gating pulses incrementally delayed with respect to the associated horizontal blanking pulses.

* * * * *